United States Patent [19]

Yamaguchi et al.

[11] Patent Number: 4,888,059
[45] Date of Patent: Dec. 19, 1989

[54] CEMENT DISPERSING AGENT

[75] Inventors: Kouichi Yamaguchi, Izumi-ohtsu; Tokio Goto, Takaishi, both of Japan

[73] Assignee: Dainippon Ink and Chemicals, Inc., Tokyo, Japan

[21] Appl. No.: 136,344

[22] Filed: Dec. 22, 1987

[30] Foreign Application Priority Data

Dec. 25, 1986 [JP] Japan ................ 61-307983

[51] Int. Cl.⁴ ............................................ C04B 24/04
[52] U.S. Cl. ...................................... 106/314; 106/90; 106/315; 524/5
[58] Field of Search .................... 106/90, 314, 315; 524/5

[56] References Cited

U.S. PATENT DOCUMENTS 3,850,651 11/1974 Duncan et al. ...................... 106/90
4,473,406 9/1984 Bradley et al. ...................... 106/90

FOREIGN PATENT DOCUMENTS 42-012435 7/1967 Japan .
52-033646 8/1977 Japan .
53-43731 4/1978 Japan .
58-074552 5/1983 Japan .
59-045949 3/1984 Japan .
59-162160 9/1984 Japan .
61-031333 2/1986 Japan ................................. 106/314
61-72660 4/1986 Japan .
1236263 6/1971 United Kingdom .

*Primary Examiner*—William R. Dixon, Jr.
*Assistant Examiner*—Anthony J. Green
*Attorney, Agent, or Firm*—Sherman and Shalloway

[57] ABSTRACT

A cement dispersing agent comprising as an essential component a copolymer obtained by copolymerizing (a) 40 to 90% by weight, calculated as an alpha,beta-ethylenically unsaturated carboxylic acid, of the alpha,-beta-ethylenically unsaturated carboxylic acid and/or its salt and (b) 60 to 10% by weight of an acrylic ester and/or a methacrylic ester of an alkyl alcohol having 1 to 4 carbon atoms, or a copolymer obtained by copolymerizing (a) 40 to 89% by weight, calculated as an alpha,beta-ethylenically unsaturated carboxylic acid, of the alpha,beta-ethylenically unsaturated carboxylic acid and/or its salt, (b) 51 to 10% by weight of an acrylic ester and/or a methacrylic ester of an alkyl alcohol having 1 to 4 carbon atoms and (c) 1 to 9% by weight of the other copolymerizable unsaturated monomer.

10 Claims, No Drawings

CEMENT DISPERSING AGENT

This invention relates to a novel useful cement dispersing agent, and more particularly to a cement dispersing agent comprising as an essential component a copolymer of an alpha,beta-unsaturated carboxylic acid and/or its salt and an alkyl (meth)acrylate, said dispersing agent having excellent properties such that a fluidity of the cement can be improved with the use of a small amount of the dispersing agent, a decrease of fluidity with time is preventable and a strength of the cement-cured product can rapidly be developed.

Cement dispersing agents have been hitherto used to improve a workability by e.g. increasing a fluidity of cement blends or to enhance a strength of cement-molded articles by decreasing an amount of a mixing water without lowering the workability.

Lignin sulfonate-type, naphthalenesulfonate-formalin condensate-type and melamine sulfonate-formalin condensate-type dispersing agents have now been used. Nevertheless, the lignin sulfonate-type dispersing agents suffer drawbacks that an air entraining property is high and a strength of cement cured products is notably decreased. The naphthalenesulfonate-formalin condensate-type and melamine sulfonate-formalin condensate-type dispersing agents have a low air entraining property and a high cement dispersibility but a short duration time of the effect, thereby suffering a drawback that a decrease of flowability (hereinafter called a "slump loss") of cement blends with time is notable.

In recent years, copolymers of alpha,beta-unsaturated carboxylic acids and chain olefins and other polycarboxylic acids are known as dispersing agents to prevent a slump loss. However, these dispersing agents have drawbacks that when they are used in small amounts, a sufficient fluidity of cement blends is not obtained and when they are used in large amounts, curing of cements is much retarded. Moreover, when synthesizing such copolymers, ketone, aromatic or aliphatic hydrocarbon organic solvents are used. However, they have an adverse effect on curing of cements, solvent replacement has to be conducted from the aspect of toxicity, and the synthesis process gets complicated; they are thus unwanted from the aspects of preservation of the environment and economics.

Accordingly, an object of this invention is to improve the various drawbacks associated with the aforesaid prior art.

The present inventors have made extensive studies to obtain, via a reaction in water, cement dispersing agents which, when used in small amounts at the time of mixing with cements, keep an excellent fluidity, prevent a slump loss and quickly develop a strength of cement cured products as well as are advantageous from the aspects of no pollution and economics. Consequently, it has been discovered that a cement dispersing agent comprising as an essential component a copolymer obtained by copolymerizing (1) an alpha,beta-ethylenically unsaturated carboxylic acid and/or its salt, (2) a (meth)acrylic ester of an alcohol having 1 to 4 carbon atoms and optionally (3) the other copolymerizable unsaturated monomer is quite excellent.

Thus, this invention is to provide a cement dispersing agent comprising as an essential component a copolymer obtained by copolymerizing (a) 40 to 90% by weight, calculated as an alpha,beta-ethylenically unsaturated carboxylic acid, of the alpha,beta-ethylenically unsaturated carboxylic acid and/or its salt and (b) 10 to 60% by weight of a (meth)acrylic ester of an alkyl alcohol having 1 to 4 carbon atoms, or a copolymer obtained by copolymerizing (a) 40 to 89% by weight, calculated as an alpha,beta-ethylenically unsaturated carboxylic acid, of the alpha,beta-ethylenically unsaturated carboxylic acid and/or its salt, (b) 10 to 51% by weight of a (meth)-acrylic ester of an alkyl alcohol having 1 to 4 carbon atoms, and (c) 1 to 9% by weight of the other copolymerizable unsaturated monomer.

Typical examples of (a) the alpha,beta-ethylenically unsaturated carboxylic acid are unsaturated monocarboxylic acids such as (meth)acrylic acid and crotonic acid; unsaturated dicarboxylic acids such as itaconic acid, citraconic acid, fumaric acid, maleic acid and mesaconic acid; and half esters of these varied unsaturated dicarboxylic acids.

Typical examples of the salt of the alpha,beta-ethylenically unsaturated carboxylic acid are salts formed from said varied alpha,beta-ethylenically unsaturated carboxylic acids and e.g. alkali metal ions, alkaline earth metal ions, organic amine ions or ammonia.

These varied alpha,beta-ethylenically unsaturated carboxylic acids or their salts may be used either singly or in admixture.

Meanwhile, typical examples of (b) the (meth)-acrylic ester of the alkyl alcohol having 1 to 4 carbon atoms are methyl (meth)acrylate, ethyl (meth)acrylate, n-butyl (meth)acrylate, iso-butyl (meth)acrylate and tert-butyl (meth)acrylate. They may be used either singly or in admixture.

Besides, examples of (c) the other copolymerizable unsaturated monomer are (meth)acrylic esters of alkyl alcohols having 5 or more carbon atoms, preferably, 5 to 12 carbon atoms, such as 2-ethylhexyl (meth)-acrylate and lauryl (meth)acrylate; hydroxyalkyl (meth)acrylates such as 2-hydroxyethyl (meth)acrylate, 2-hydroxypropyl (meth)-acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate and polyethylene glycol mono(meth)acrylate; unsaturated bond-containing polyhydroxyalkyl esters typified by hydroxyalkyl esters of unsaturated dicarboxylic acids such as fumalic acid and maleic acid; varied hydroxyl group-containing unsaturated monomers typified by hydroxyalkyl vinyl ethers such as hydroxyethyl vinyl ether; varied carboxylic acid amide group-containing unsaturated monomers typified by (meth)-acrylamide, N,N-dimethyl (meth)acrylamide, N-alkoxymethylated (meth)acrylamide, diacetone acrylamide and N-methylol (meth)acrylamide; varied sulfonic acid amide group-containing unsaturated monomers typified by p-styrene sulfonamide, N-methyl-p-styrene sulfonamide and N,N-dimethyl-p-styrene sulfonamide; varied tertiary amino group-containing unsaturated monomers typified by N,N-dialkylaminoalkyl (meth)acrylates such as N,N-dimethylaminoethyl (meth)acrylate or mono-2-dimethylaminoethyl maleate, which are formed by addition reaction of acid anhydride group-containing unsaturated monomers such as maleic anhydride with compounds having active hydrogen reactive with the acid anhydride group and a tertiary amino group; cyano group-containing unsaturated monomers typified by (meth)acrylonitrile; varied phosphoric ester linkage-containing unsaturated monomers typified by acid phosphoxyethyl methacrylate, which are obtained by condensation reaction of hydroxyalkyl (meth)acrylate such as hydroxyethyl (meth)acrylate with phosphoric acid or phosphoric esters; sulfonic group-containing unsaturated monomers such as sodium vinylsulfonate and 2-acrylamido-2-methylpropanesulfonic acid; varied aromatic vinyl compounds such as styrene, alpha-methylstyrene, p-tert-butylstyrene and p-methylstyrene; (substituted) aromatic nucleus-containing (meth)acrylic esters such as benzyl (meth)acrylate; diesters typified by diethyl maleate, which are formed by reaction of unsaturated dicarboxylic acids such as maleic acid, fumalic acid and itaconic acid with monohydric alcohols such as ethyl alcohol and butyl alcohol; (per)fluoroalkyl group-containing vinyl esters such as perfluoro-n-butyl (meth)acrylate, perfluoro-cyclohexyl (meth)acrylate, di-perfluorocyclohexyl fumalate and N-iso-propylperfluorooctanesulfnamidoethyl (meth)-acrylate; vinyl esters such as vinyl acetate, vinyl benzoate and "Veova" (a tradename for a vinyl ester made by Shell International, Holland); varied olefins such as vinyl chloride, vinylidene chloride, vinyl fluoride, vinylidene fluoride, chlorotrifluoroethylene, ethylene and propylene; (meth)acrylic acid methoxypolyalkylene glycol esters; allyl alcohols or alkylene oxide adducts of allyl alcohols; and glycidyl group-containing unsaturated monomers. They may be used either singly or in admixture.

When producing the cement dispersing agent of this invention, it is advisable from the aspects of cement dispersibility, duration of the dispersing effect and ease of the polymerization reaction that the alpha,beta-ethylenically unsaturated carboxylic acid is used such that acrylic acid and/or methacrylic acid becomes 70% by weight or more based on the overall alpha,beta-ethylenically unsaturated carboxylic acid.

The amount of (a) the alpha,beta-ethylenically unsaturated carboxylic acid and/or its salt is within the range of, generally 40 to 90% by weight, preferably 55 to 89% by weight, and more preferably 55 to 85% by weight based on the sum of the monomers. Where the amount is less than 40% by weight, the dispersibility of the cement is poor when the resulting copolymer is added to the cement. Meanwhile, where the amount exceeds 90% by weight, the dispersibility of the cement is poor when the resulting copolymer is added to the cement as well as curing of the cement is notably retarded. Either case is thus unwanted.

Said alpha,beta-ethylenically unsaturated carboxylic acid is subjected to copolymerization reaction in unneutralized state or in such salt form that part or the whole thereof is neutralized with the aforesaid alkali metal ions, alkaline earth metal ions, organic amine ions or ammonia.

As (b) the (meth)acrylic ester, it is advisable to mainly use methyl (meth)acrylate and/or ethyl (meth)-acrylate from the aspects of the cement dispersibility and the ease of the polymerization reaction. The suitable amount of (b) the (meth)acrylic ester is within the range of 10 to 60% by weight, preferably 15 to 45% by weight based on the sum of the monomers. When (c) the other polymerizable unsaturated monomer is however optionally used, the suitable amount of (b) the (meth)acrylic ester is within the range of 10 to 51% by weight, preferably 15 to 50% by weight. Where the amount is less than 10% by weight, the cement dispersibility is poor and curing of the cement is retarded. On the other hand, when it is more than 60% by weight, the hydrophilic nature of the resulting polymer decreases, the cement dispersibility is poor and the air entraining property goes high. Either case is thus unwanted.

It is advisable that (c) the optionally used other copolymerizable unsaturated monomer is chosen to balance the hydrophilic and hydrophobic natures of the resulting copolymer. The suitable mount thereof is within the range of 1 to 9% by weight based on the sum of the monomers.

As a method for preparing the copolymer, the essential component making up the cement dispersing agent in this invention from the aforesaid monomers, a radical polymerization method is general, and above all, a solution polymerization method is most convenient and preferable. In this case, the polymerization reaction is carried out in the presence of an aqueous medium. The aqueous medium comprises 90% by weight or more of water and 10% by weight or less of a water-soluble organic solvent. Typical examples of such organic solvent are an alkyl alcohol having 1 to 4 carbon atoms, methyl cellosolve, ethyl cellosolve, n-propyl cellosolve, iso-propyl cellosolve, n-butyl cellosolve, iso-butyl cellosolve, tert-butyl cellosolve, methyl carbitol, ethyl carbitol, n-propyl carbitol, iso-propyl carbitol, n-butyl carbitol, iso-butyl carbitol, tert-butyl carbitol, dimethyl formamide, dimethylacetamide and dimethyl sulfoxide. It is preferable to use water alone as the aqueous medium. This is because the use of the organic solvent is not desirable from the aspects of toxicity and hazard and has an adverse effect on curing of the cement, so that the solvent replacement must be done and thus involves demerits in procedure and economics.

Examples of the radical polymerization initiator are peroxides typified by benzoyl peroxide and tert-butyl peroxybenzoyl, azo compounds typified by azobisisobutyronitrile, and persulfates typified by potassium persulfate and ammonium persulfate. They have to be properly selected according to reaction conditions.

The copolymerization reaction is performed in the presence of the radical polymerization initiator usually at a temperature of 50 to 150° C. under atmospheric pressure or increased pressure. It is preferably carried out at the polymerization temperature of 50 to 100° C. under atmospheric pressure.

The cement dispersing agent containing the thus obtained copolymer as the essential component may be used as such or if required, in the form of alkali metal salt, alkaline earth metal salt, ammonia or organic amine salt by further neutralizing part or the whole of unneutralized acid groups. The resulting copolymer may have a wideranging weight average molecular weight (hereinafter simply called a "molecular weight"), preferably 1000 to 50000 by analysis with gel permeation chromatography using polyethylene glycol as a standard substance. Where it is less than 1000, curing of the cement is retarded. Where it exceeds 50000, the cement dispersibility decreases. It is more preferably 10000 to 40000.

The cement dispersing agent of this invention can be used as a solid or powder, but is ordinarily used as a solution or an aqueous dispersion.

The cement dispersing agent in this invention may optionally contain the additives: known air entraining agents such as alkyl benzenesulfonates, lignin sulfonates and sulfate esters of higher aliphatic alkylene oxide adducts; known dispersing agents such as polyalkylene glycols, styrene sulfonic acid polymers, copolymers of styrene sulfonic acid and alpha,beta-ethylenically unsaturated monomers, hydroxycarboxylates, polyethylene sulfonate, copolymers of alpha,beta-ethylenically unsaturated carboxylic acids and chain olefins, sulfonates of heavy-duty aromatic hydrocarbons and their formalin condensates; known cement dispersing agents such as lignin sulfonate, salts of naphthalenesulfonate-formalin condensates and salts of melamine sulfonate-formalin condensates; known cement curing accelerators such as sodium chloride, potassium chloride, sodium sulfate, sodium carbonate, potassium carbonate, sodium thiosulfate and alkanolamines; known cement curing retarders such as lignosulfonic acid, gluconic acid, citric acid, tartaric acid and polyphosphoric acid; known warp sizing agents such as polyvinyl alcohol, starches, methyl cellulose and hydroxymethyl cellulose; and known anticorrosive agents such as sodium nitrite and potassium nitrite.

The cement dispersing agent in this invention can be used in hydraulic cements such as a portland cement, alumina cement and various mixed cements. On this occasion, the amount of the cement dispersing agent in this invention may vary with usage and required properties of the cement. It is usually 0.01 to 1.00% by weight, preferably 0.05 to 0.75, based on the cement, as a solids content of the copolymer, an essential component of said dispersing agent. Where the amount is less than 0.01% by weight, the cement dispersibility is not enough. Where it exceeds 1.00% by weight, the dispersing effect remains unchanged and it is unprofitable also from the economical aspect.

The cement dispersing agent in this invention is added when the mixing water is charged. There are varied embodiments that when the mixing water is charged, the dispersing agent is added in the form dissolved in such mixing water, and that when the cement composition is kneaded, the dispersing agent is added to the kneaded cement composition. In that instance, the dispersing agent may be added in two or more divided portions.

The following Referential Examples, Examples and Comparative Examples illustrate this invention in more detail. All parts and percentages are on the weight basis unless otherwise indicated.

REFERENTIAL EXAMPLES 1-11

PREPARATION OF COPOLYMERS

In a stainless steel reaction vessel equipped with a thermometer, a stirrer, a dropping funnel, a nitrogen gas introducing tube and a reflux condenser, varied alpha,-beta-ethylenically unsaturated carboxylic acids and/or their salts (a), varied (meth)acrylic esters (b) and optionally the other copolymerizable unsaturated monomers (c) shown in Table 1 were copolymerized in varied ratios shown in Table 1 using a persulfate as a radical polymerization initiator and water as a solvent for polymerization reaction.

In Table 1, the unit of the amounts of these monomers is "parts".

The resulting copolymers have the weight average molecular weight in the range of 10000 to 40000, and are all in the form of sodium salts.

REFERENTIAL EXAMPLES 12-15

PREPARATION OF CONTROL COPOLYMERS

Control copolymers were prepared as in Referential Examples 1-11 except that the monomers shown in Table 1 were used in ratios shown in Table 1.

The resulting copolymers have the weight average molecular weight in the range of 10000 to 40000 and are obtained in the form of sodium salts.

TABLE 1

| | Alpha,beta-ethylenically unsaturated carboxylic acid (%)[1] | | Acrylic ester (%) | | | | Other copolymerizable unsaturated monomer (%) | | | | Non-volatile content (%) |
|---|---|---|---|---|---|---|---|---|---|---|---|
| | Acrylic acid | Methacrylic acid | Methyl acrylate | Methyl methacrylate | Ethyl acrylate | n-Butyl methacrylate | Acrylamide | beta-H[*2] | Vinyl acetate | NASS[*3] | |
| Referential Example | | | | | | | | | | | |
| 1 | 65 | — | — | 30 | — | — | 5 | — | — | — | 30 |
| 2 | — | 45 | — | 50 | — | — | — | 5 | — | — | 30 |
| 3 | — | 70 | — | 30 | — | — | — | — | — | — | 30 |
| 4 | — | 85 | — | 15 | — | — | — | — | — | — | 30 |
| 5 | — | 75 | 5 | 20 | — | — | — | — | — | — | 30 |
| 6 | 85 | — | — | — | 15 | — | — | — | — | — | 30 |
| 7 | — | 75 | — | — | 25 | — | — | — | — | — | 30 |
| 8 | — | 75 | — | 10 | 10 | — | — | 5 | — | — | 30 |
| 9 | — | 85 | — | 10 | — | — | — | — | 5 | — | 30 |
| 10 | 30 | 40 | 10 | 15 | — | — | — | — | — | 5 | 30 |
| 11 | 60 | — | 10 | 20 | — | 5 | — | 5 | — | — | 30 |
| 12 | 90 | — | — | 5 | — | — | 5 | — | — | — | 30 |
| 13 | — | 95 | — | 5 | — | — | — | — | — | — | 30 |
| 14 | — | 100 | — | — | — | — | — | — | — | — | 30 |
| 15[*4] | — | 35 | — | 65 | — | — | — | — | — | — | 30 |

[*1] Weight percent, calculated as an alpha,beta-ethylenically unsaturated carboxylic acid, of the alpha-beta,ethylenically unsaturated carboxylic acid/or its salt.
[2] 2-Hydroxyethyl methacrylate
[*3] Sodium styrenesulfonate
[*4] As polymerization in water was impossible, polymerization was conducted in isopropyl alcohol and the solvent was then replaced.

EXAMPLES 1-11 AND COMPARATIVE EXAMPLES 1-9

Varied concrete blends were produced using the individual copolymers obtained in Referential Examples 1-11 and Referential Examples 12-15. Subsequently, the concrete blends were measured for fluidity (slump) of the concrete, change of slump with time of the concrete and compression strength at the age of 7 or 28 days.

Comparative Examples 1-4 were those using the copolymers obtained in Referential Examples 12-15, respectively.

Meanwhile, varied control concrete blends were likewise produced using no dispersing agent (Comparative Example 5), a commercial lignin sulfonate-type cement dispersing agent (Comparative Example 6), a commercial melamine sulfonate-formalin condensate-type cement dispersing agent (Comparative Example 7), a commercial naphthalenesulfonate-formalin condensate-type cement dispersing agent (Comparative Example 8) and a commercial maleic anhydride-isoamylene copolymer sodium salt-type cement dispersing agent (Comparative Example 9). Thereafter, the concrete blends were measured for the above properties. The results are shown in Table 3.

By the way, the slump of the concrete and the change of slump with time of the concrete were measured using a concrete of the following material as shown in Table 2 in accordance with Japan Industrial Standard.

Materials used:
Cement: Normal portland cement
Fine aggregates: Fine aggregates obtained of Kinokawa, Wakayama-ken, Japan
Coarse aggregates: crushed stones obtained in Takarazuka-shi, Hyogo-ken, Japan

TABLE 2

| Cement | Water | Fine aggregates | Coarse aggregates | Water/cement ratio | Fine aggregates |
|---|---|---|---|---|---|
| 275 parts | 151 parts | 1100 parts | 1650 parts | 55% | 40% |

Note:
In case of not using the dispersing agent, the water/cement ratio was made 60.

TABLE 3

| | Amount added (%/cement)*2 | Just after mixture | After 30 minutes | After 90 minutes | 7 days | 28 days |
|---|---|---|---|---|---|---|
| Example | | | | | | |
| 1 | 0.20 | 21.9*4 (100) | 20.4 (93) | 18.1 (83) | 246 | 385 |
| 2 | 0.20 | 19.9 (100) | 19.5 (98) | 17.1 (86) | 247 | 400 |
| 3 | 0.15 | 21.8 (100) | 21.6 (99) | 18.3 (84) | 268 | 425 |
| 4 | 0.15 | 21.0 (100) | 20.9 (100) | 18.5 (88) | 251 | 404 |
| 5 | 0.15 | 21.7 (100) | 21.5 (99) | 19.2 (88) | 270 | 423 |
| 6 | 0.15 | 20.8 (100) | 20.5 (99) | 19.0 (91) | 242 | 398 |
| 7 | 0.15 | 21.9 (100) | 21.7 (99) | 19.0 (87) | 259 | 413 |
| 8 | 0.15 | 21.8 (100) | 21.4 (98) | 18.6 (85) | 248 | 409 |
| 9 | 0.15 | 21.2 (100) | 21.0 (99) | 18.3 (86) | 259 | 410 |
| 10 | 0.17 | 20.8 (100) | 20.3 (98) | 18.0 (87) | 255 | 410 |
| 11 | 0.20 | 21.6 (100) | 20.0 (97) | 17.6 (85) | 246 | 390 |
| Comparative Example | | | | | | |
| 1 | 0.25 | 21.5 (100) | 20.9 (97) | 19.8 (92) | 239 | 410 |
| 2 | 0.25 | 20.9 (100) | 20.5 (98) | 19.9 (95) | 220 | 329 |
| 3 | 0.30 | 20.5 (100) | 20.4 (100) | 19.7 (96) | 210 | 333 |
| 4 | 0.30 | 20.0 (100) | 18.1 (91) | 13.5 (68) | 230 | 372 |
| 5 | 0.00 | 20.5 (100) | 17.9 (87) | 13.8 (67) | 230 | 350 |
| 6 | 0.30 | 20.8 (100) | 17.4 (84) | 13.7 (66) | 220 | 340 |
| 7 | 0.20 | 21.5 (100) | 15.9 (74) | 11.2 (52) | 251 | 410 |
| 8 | 0.20 | 21.5 (100) | 15.1 (70) | 10.8 (70) | 246 | 388 |
| 9 | 0.28 | 20.1 (100) | 19.8 (99) | 19.5 (77) | 229 | 355 |

*1 In order to clarify properties of varied dispersing agents, the initial slumps were rendered almost identical by making the amount of the cement identical and varying the amount of the dispersing agent.
*2 The amount added was shown by the non-volatile content (wt. %) of the dispersing agent to the cement.
*3 Standard aging
*4 The parenthesized value was a slump loss shown by a value of a slump residue [(slump after a fixed time) ÷ (slump just after mixing) × 100 (%)].

As is apparent from the results in Table 3, the products of this invention are, when mixed even in small amounts with the cement, excellent in fluidity of the cement and preventability of the slump loss, and quickly develop the strength of the cement cured products compared to the control products and commercial products.

EXAMPLES 12–16

A cement dispersing agent comprising as an essential component 75 parts of methacrylic acid and 25 parts of methyl methacrylate was measured for compression strength and fluidity of the cement shown by a "mortar flow value" when the weight average molecular weight of the copolymer was changed.

Incidentally, the fluidity and the compression strength of the cement were measured using a mortar of the following material as shown in Table 4 according to Japan Industrial Standard.

Material used:
Cement: Normal portland cement
Fine aggregates: Standard sand obtained in Toyoura-cho, Toyoura-gun, Yamaguchi-ken

TABLE 4

| Cement | Water | Fine aggregates | Amount of dispersing agent | Water/cement ratio |
|---|---|---|---|---|
| 520 parts | 259 parts | 1040 parts | 0.60% | 50% |

Note:
The amount of the dispersing agent is weight percentage as a solids content based on the cement.

TABLE 5

| Example | Weight average molecular weight of the copolymer used | Mortar flow | Compression strength (kg/cm$^2$) 7 days | 28 days |
|---|---|---|---|---|
| 12 | ca. 1,000 | 145 | 210 | 365 |
| 13 | 10,000 | 160 | 249 | 405 |
| 14 | 20,000 | 162 | 260 | 410 |
| 15 | 40,000 | 158 | 257 | 398 |
| 16 | 70,000 | 143 | 266 | 408 |

Note:
(1) Standard aging
(2) A physical strength was measured according to JIS R-5201.

EXAMPLES 17-21 AND COMPARATIVE EXAMPLE 20

The fluidity of the cement shown by the "mortar flow" was measured for the cement dispersing agent obtained in Example 3 in the same way as in Examples 12-16 except that the amount of the cement dispersing agent added to the cement was altered as shown in Table 6 and the water/cement ratio was changed into 45%. The results are shown in Table 6.

TABLE 6

|  |  | Amount added of a cement dispersing agent (%) | Mortar flow |
|---|---|---|---|
| Comparative Example 20 |  | 0 | 139 |
| Example | 17 | 0.01 | 145 |
|  | 18 | 0.35 | 159 |
|  | 19 | 0.60 | 163 |
|  | 20 | 1.00 | 164 |
|  | 21 | 2.00 | 164 |

It is generally considered that polycarboxylic acid-type cement dispersing agents are adsorbed to cement particles and allow ionic repulsion between cement particles to enhance the dispersibility of the cement in water and the carboxyl group is properly coordinated with calcium of the cement, so that the rate of the hydration reaction of the cement moderates and the slump loss is prevented. However, the actually available polycarboxylic acid-type cement dispersing agents that can be actually obtained notably hinder the hydration reaction of the cement owing to excessive coordination, thereby greatly retarding the curing of the cement.

On the other hand, the cement dispersing agent in this invention can strongly be adsorbed to the cement particles by adjusting the hydrophilic and hydrophobic natures of the copolymer as the essential component of the dispersing agent, and besides exhibits the excellent dispersibility. Accordingly, a small amount of the cement dispersing agent is sufficient. Further, as the hydration reaction of the cement is little hindered, the strength of the cement blend is quickly increased.

In addition, since the copolymer making up the cement dispersing agent in this invention is easily prepared in the aqueous medium, it is advantageous from the aspects of no pollution and economics too.

What we claim is:

1. A cement dispersing agent consisting essentially of a copolymer obtained by copolymerizing a reaction mixture consisting essentially of (a) 40 to 90% by weight, calculated as an alpha,beta-ethylenically unsaturated monocarboxylic acid, of at least one compound selected from the group consisting of an alpha,beta-ethylenically unsaturated monocarboxylic acid and a salt of the alpha,beta-ethylenically unsaturated monocarboxylic acid and (b) 60 to 10% by weigh of at least one compound selected from the group consisting of an acrylic ester of a monohydric alkyl alcohol having 1 to 4 carbon atoms and a methacrylic ester of a monohydric alkyl alcohol having 1 to 4 carbon atoms, or a copolymer obtained by copolymerizing a reaction mixture consisting essentially of (a) 44 to 89% by weight, calculated as an alpha,beta-ethylenically unsaturated monocarboxylic acid, of at least one compound selected from the group consisting of an alpha,beta-ethylenically unsaturated monocarboxylic acid and a salt of the alpha,-beta-ethylenically unsaturated monocarboxylic acid, (b) 51 to 10% by weight of at least one compound selected from the group consisting of an acrylic ester of a monohydric alkyl alcohol having 1 to 4 carbon atoms and a methacrylic ester of a monohydric alkyl alcohol having 1 to 4 carbon atoms and (c) 1 to 5% by weight of a copolymerizable unsaturated monomer.

2. The cement dispersing agent of claim 1 wherein the alpha-beta-ethylenically unsaturated monocarboxylic acid is methacrylic acid.

3. The cement dispersing agent of claim 1 wherein the alpha-beta-ethylenically unsaturated monocarboxylic acid is acrylic acid.

4. The cement dispersing agent of claim 1 wherein the salt of the alpha-beta-ethylenically unsaturated monocarboxylic acid is a salt formed from the alpha,beta-ethylenically unsaturated monocarboxylic acid and an alkali metal.

5. The cement dispersing agent of claim 1 wherein the methacrylic ester of the monohydric alkyl alcohol having 1 to 4 carbon atoms is methyl methacrylate.

6. The cement dispersing agent of claim 1 wherein the methacrylic ester of the monohydric alkyl alcohol having 1 to 4 carbon atoms is ethyl methacrylate.

7. The cement dispersing agent of claim 1 wherein the acrylic ester of the monohydric alkyl alcohol having 1 to 4 carbon atoms is methyl acrylate.

8. The cement dispersing agent of claim 1 wherein the acrylic ester of the monohydric alkyl alcohol having 1 to 4 carbon atoms is ethyl acrylate.

9. A cement dispersing agent consisting essentially of a copolymer obtained by copolymerizing a reaction mixture consisting essentially of (a) 40 to 90% by weight, calculated as an alpha,beta-ethylenically unsaturated monocarboxylic acid, of at least one compound selected from the group consisting of an alpha,beta-ethylenically unsaturated monocarboxylic acid and a salt of the alpha,beta-ethylenically unsaturated monocarboxylic acid and (b) 60 to 10% by weight of at least one compound selected from the group consisting of an acrylic ester of a monohydric alkyl alcohol having 1 to 4 carbon atoms and a methacrylic ester of a monohydric alkyl alcohol having 1 to 4 carbon atoms in an aqueous medium, or a copolymer obtained by copolymerizing a reaction mixture consisting essentially of (a) 44 to 89% by weight, calculated as an alpha,beta-ethylenically unsaturated monocarboxylic acid, of at least one compound selected from the group consisting of an alpha,-beta-ethylenically unsaturated monocarboxylic acid and a salt of the alpha,beta-ethylenically unsaturated monocarboxylic acid, (b) 51 to 10% by weight of at least one compound selected from the group consisting of an acrylic ester of a monohydric alkyl alcohol having 1 to 4 carbon atoms and a methacrylic ester of a monohydric alkyl alcohol having 1 to 4 carbon atoms and (c) 1 to 5% by weight of a copolymerizable unsaturated monomer in an aqueous medium.

10. The cement dispersing agent of claim 9 wherein the aqueous medium is water.

* * * * *

Notice of Adverse Decision in Interference

In Interference No. 102,436, involving Patent No. 4,888,059, K. Yamaguchi, T. Goto, CEMENT DISPERSING AGENT, final judgement adverse to the patentees was rendered Jan. 29, 1991, as to claims 1-10.

*(Official Gazette March 5, 1991)*